UNITED STATES PATENT OFFICE.

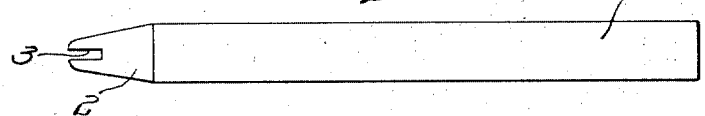
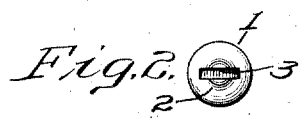
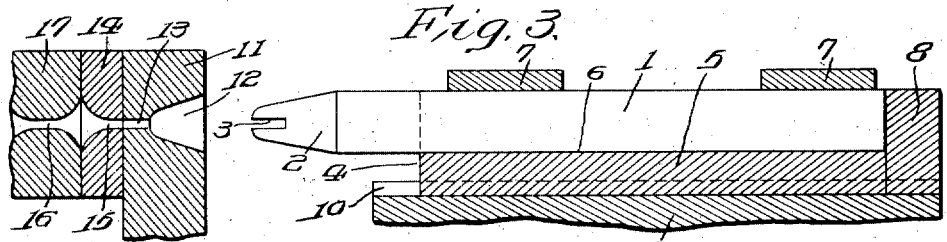
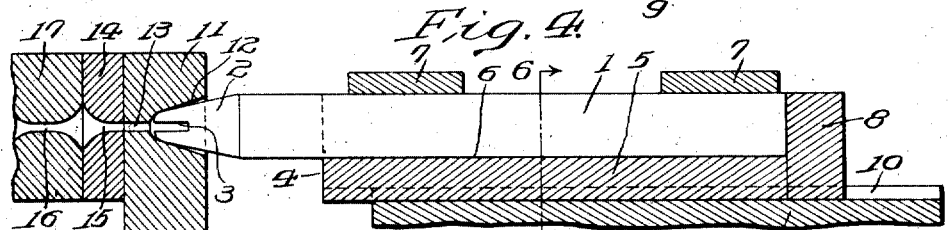
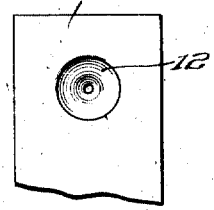
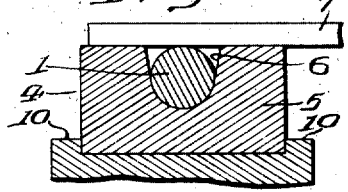
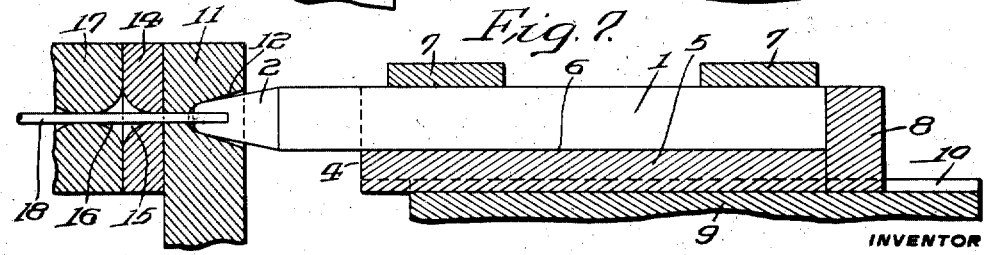
INVENTOR
William W. Moyer.

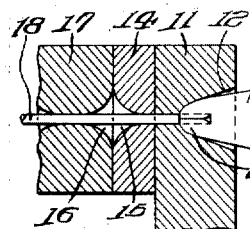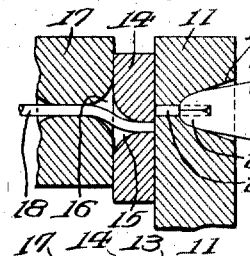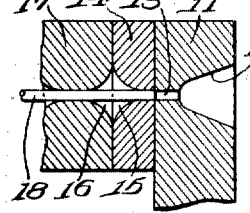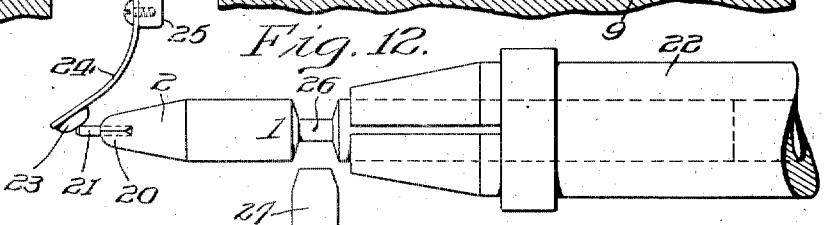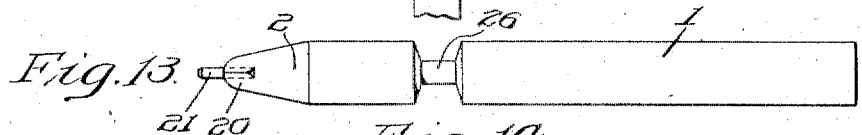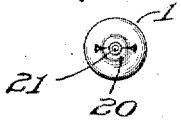

WILLIAM W. MOYER, OF CAMDEN, NEW JERSEY, ASSIGNOR TO VICTOR TALKING MACHINE COMPANY, A CORPORATION OF NEW JERSEY.

METHOD OF MAKING STYLI, &c.

1,251,907.  Specification of Letters Patent.  Patented Jan. 1, 1918.

Application filed December 11, 1915. Serial No. 66,260.

*To all whom it may concern:*

Be it known that I, WILLIAM W. MOYER, a citizen of the United States, and a resident of Camden, county of Camden, and State of New Jersey, have invented certain new and useful Improvements in Methods of Making Styli for Use in Connection with the Reproduction of Sound from Talking-Machine Records, of which the following is a specification.

It has been discovered that tungsten or tungstenic material is peculiarly adapted for styli or needles of sound reproducing machines. A stylus composed of tungsten or tungstenic material exhibits properties differing in a marked degree from styli of other materials. Among the characteristics are that a stylus of tungsten or tungstenic material has little injurious effect upon the walls of the sound record groove during the reproduction of the sound from a record, and may be used, a large number of times and on different records without injuriously affecting the walls of the sound record groove. It also appears to rapidly wear, at first, until its sides, in engagement with the sound record groove, fit and conform to the shape of the groove, after which the wear is negligible or inappreciable throughout the reproduction of sound from the remainder of the groove of the record.

Tungsten is, however, a difficult material to work, particularly when it is in the form of a wire, the diameter of which is equal to the width of a sound record groove. Tungsten wire is brittle and tends to split. It is also expensive. Since only a very small portion of a stylus is in actual contact with the sound record groove in reproducing sound from a record, it is obviously desirable to employ as little of it as possible. If, therefore, a steel shank be provided with a tip of tungsten or tungstenic material to engage and coöperate with the walls of the sound record groove, substantially all of the desirable properties of tungsten and tungstenic materials, as applied to this art, are utilized, and the present invention has for its purpose the making of a stylus having a shank of cheaper more easily worked material and a record engaging tip or point of tungstenic material firmly and permanently united therewith or attached thereto.

Referring now to the drawings forming a part of this specification in which the same reference characters are employed to designate the same parts throughout the various views, Figure 1 is a side elevation of a rod or wire of malleable metal tapered and slotted at one free end, the same being of a size adapted to form with the shank or body portion of a stylus for sound reproducing machines. In actual practice, the shank or body portion is less than one one-sixteenth of an inch in diameter, and about three fourths of an inch long. For the sake of clearness, the drawings are made on a greatly enlarged scale throughout the various views.

Fig. 2 is an end view of the shank or body portion illustrated in Fig. 1.

Fig. 3 shows the shank or body portion of malleable wire held in a suitable slidable carrier and positioned in alinement with a die of hard steel.

Fig. 4 shows the stylus body, together with its carrier moved to bring the end of the stylus into engagement with the die.

Fig. 5 is an end front view of the die showing the cupped recess therein, and the small aperture at the bottom through which the tungsten wire is adapted to be threaded.

Fig. 6 is a cross-sectional view on the line 6—6 of Fig. 4 showing the carrier in which the body or shank of the stylus is positioned, held and moved during the practice of the steps of the process of this application.

Fig. 7 is a view similar to Fig. 4 but in which the tungsten wire has been inserted in the slot in the free end of the shank or body portion of the stylus.

Fig. 8 is an end view of the stylus showing the tungsten wire held in position as indicated in Fig. 7.

Fig. 9 indicates the next step of the process which consists in imparting to the carrier, and to the stylus body or shank carried thereby, a sharp blow, or a succession of blows, to force the tapered end of the malleable steel wire into the bottom of the cup-shaped die to swage the tapered end of the shank and make it conform in shape to the bottom of the die, to close the slot at the sides of the tungsten wire insert, and to force the metal of the end of the shank into tight gripping engagement with the tungsten wire insert.

Fig. 10 shows the cutting or severing of the tungsten wire at a short distance from the point where it protrudes from the shank or body portion.

Fig. 11 shows the carrier moved back from the die, and the stylus shank or body with the tungsten wire tip swaged therein.

Fig. 12 illustrates diagrammatically the grinding of the sharp free edge of the tungsten wire tip to slightly bevel the same and remove any burs or sharp edges which might be thereon.

Fig. 13 indicates the completed stylus, and

Fig. 14 is a front end view of the same.

In carrying out the invention, a piece of straight wire of substantially the length of a talking machine stylus or needle is tapered or beveled at one of its ends and slotted to form a shank or body portion 1, such as is shown in Fig. 1. This body or shank is of preferably a malleable wire, such as soft steel, is about one sixteenth of an inch in diameter and substantially three fourths of an inch long. The shank, shown in Fig. 1, is preferably made on any suitable screw making machine. The shank or body portion 1 so formed is thus provided with a tapered end 2 and a transverse narrow slot or kerf 3. The width of this slot, channel or kerf is very small, preferably substantially six one thousandths of an inch, that is to say its diameter is substantially equal to the width of a sound record groove in a commercial sound record tablet.

The shank or body portion 1 thus formed is then preferably placed in a suitable holder or carrier 4, which preferably consists of an iron or steel block 5 having a groove or channel 6 in the top face thereof, the width of said groove 6, being substantially the same as the diameter of the shank or body portion 1. The bottom of the groove 6 is semicircular and of a radius equal to the radius of the shank or body portion 1. In this way, the under half of the shank or body portion 1 will snugly fit into the bottom of the channel or groove 6 throughout the length of the block 5 and its top surface will be exactly on a level with or a trifle above the top surface of the block 5. Any suitable holding straps or fingers 7—7 may then be arranged to slide over the top of the block 5 to firmly hold or clamp the body portion or shank 1 seated in said groove. The said carrier 4 is preferably provided at its rear end with a hard steel anvil 8, made unitary with the block or carrier 5 in any suitable manner, and the shank or body portion 1 is held in the carrier with its rear end squarely seated against the block or anvil 8.

The carrier 4 is preferably relatively freely slidable on a base or support 9 between guides 10—10 arranged parallel to the axis of the groove 6 in the block 5. In alinement with the axis of the shank or body portion 1, when it is seated in the groove 6, as above described, is a die 11 of hard steel, the same having a cup-shaped recess 12 in that face nearest the end of the shank or body portion 1. At the bottom of the recess 12 in the die 11 is a small opening 13 in axial alinement with the cup-shaped recess 12, said opening 13 being preferably of a diameter substantially equal to the width of the slot 3.

Against the rear face of the die 11, a cutting blade 14 bears tightly and is provided with a passage 15 therethrough. Said passage 15 is substantially the same diameter as the opening 13 at its end adjacent the die 11, and its opposite end is larger and preferably tapers rearwardly to register with a similar but oppositely tapered opening or passage 16 in the rear block or guide 17.

Said die 11 is preferably rigidly mounted on any suitable rigid base or support. The cup-shaped recess 12 and the openings or passages 13, 15 and 16 are normally in axial alinement with the axis of the shank or body portion 1 when the same is seated in the groove 6 of the block 5 as clearly shown in Fig. 3.

After having been positioned in the manner indicated in Fig. 3, the carrier or holder 4 is moved toward the die 11 to bring the tapered slotted end 2 of the shank or body portion 1 into engagement with the interior of the cup-shaped recess 12 of the die 11 as indicated in Fig. 4. In this stage or step of the process the end of the shank 1 does not quite reach or engage the extreme bottom of the cup-shaped recess, but the edge of the smaller end of the tapered portion 2 rests against the walls of the recess 12.

A length of tungsten wire 18 is then fed or advanced through the openings 16, 15 and 13 until its free end engages and seats on the bottom of the slot 3. The opening 13, the width of the slot 3, and the narrow or constricted parts of the passages or openings 15, and 16 are preferably of substantially the same diameter as that of the tungsten wire 18, that is to say, of substantially the size of the width of the groove of a commercial sound record tablet. The tungsten wire just passes freely through said openings. In Fig. 7 is indicated the above described step in which the tungsten wire 18 has been passed through the opening 16 in the guide 17, in the guiding blade 14 and in the die 11, and its free end is in engagement with the bottom of the slot 3 of the shank or body portion 1. In Fig. 8 the tungsten wire 18 is shown to be in the slot 3 and in axial alinement with the axis of the shank or body portion 1.

A sharp blow is then imparted to the carrier or holder 4 and through the holder or carrier 4 to the shank 1, by a hammer 19, of any suitable type actuated in any suitable manner by any suitable means. The hammer 19 drives the slotted and tapered end 2 of the shank or body portion 1 of the stylus into the bottom of the cup-shaped recess 12 in the die 11. This blow swages the tapered end 2 to the tungsten wire. It causes the tapered end to conform to the curved bottom of the recess 12, closes the slot 3 on each side of the tungsten wire 18 and compresses the metal of the tapered end 2 of the shank tightly against the tungsten insert. In this manner, the free end of the tungsten wire 18 is firmly and rigidly secured to and made substantially unitary with the tapered end 2 of the shank or body portion 1. While the blow is being imparted by the hammer 19 to the holder 4 (and thereby to the shank or body portion 1) the tungsten wire 18 is substantially free to slide or move with the shank 1, sliding slightly through the openings 13, 15 and 16, that is to say, the tungsten wire is not held clamped in the die 11 nor in the cutting blade 14, nor in the guide or support 17. The tungsten wire is preferably held yieldingly pressed against the bottom of the slide on the channel 3 when the blow is imparted to the shank 1 by the hammer 19, so that it is not bent or broken by the advance of the stylus shank into the die. As a matter of fact, the advance of the carrier or holder 4 and the shank or stylus 1 toward the die 11 as the result of the blow by the hammer 19 is very slight, but it is sufficient to shape the tapered end 2 on the shank or body portion 1 and make it conform to and take the shape of the bottom of the cup-shaped recess 12, and to close the slot 3 substantially completely around the tungsten wire 18, and to force the malleable metal of the tapered end 2 into very tight engagement with the tungsten wire 18.

The tapered end 2 of the shank or body portion 1 of the stylus having thus been swaged around the free end of the tungsten wire, the cutting blade 14 is then given a motion transversely to the axis of the tungsten wire 18 to shear off the tungsten wire at a short distance from the swayed and tapered end 20 of the shank or body 1. The distance from the bottom of the cup-shaped recess 12 to the rear face of the die 11 is made equal to the distance that the tungsten wire is to protrude from the end of the shank or body 1 in the finished stylus. Since it is not desired to cut the tungsten wire between the cutting blade 14 and the guide or block 17, the passages 15 and 16 are tapered at this point in order to permit the tungsten wire to freely bend without breaking or severing. The cutting blade 14 is then operated to sever the tungsten tip which has been swaged to the shank 1.

After the blade 14 has severed the tungsten wire 18, the carrier or holder 4 is moved rearwardly away from the die 11, carrying with it the substantially completed stylus, now comprising a shank or body portion 1 having a tapered end 2, the outer extreme end of which, 20, is tightly swaged around and firmly grips and holds a tungsten wire tip 21, the diameter of which tip is substantially equal to the width of a sound record groove.

The next step in the process is to bevel or round off the edge of the free end of the tungsten tip 21, and to thereby remove any bur which might be present on the said end as a result of the shearing of the tungsten wire inasmuch as such a bur might scratch or injure the walls of a sound record groove. This may be effected by placing the shank or body portion of the stylus in a rapidly rotating chuck and bringing the free end of the tungsten tip 21 projecting therefrom against any grinding or abrasive agent. This may be accomplished by mounting a piece of abrasive 23 (such as Arkansas stone) on the free end of a spring secured to any suitable support 25 and holding the end of the tungsten tip 21 against it while the stylus is being rapidly rotated in the chuck 22. Any grinding means, however, may be substituted therefor, such as inserting the end of the tungsten tip, while the stylus is being rotated, into a conical recess in an abrasive block, or by replacing the block of abrasive held mounted on the free end of the spring, (as diagrammatically shown in Fig. 12) with a rapidly rotating abrasive wheel.

A side elevational view of the finished stylus is indicated in Fig. 13 and an end view of the same is shown in Fig. 14. It is to be observed that the slot 3 in the original shank or body portion 1 has been tightly closed by this swaging process and that only a slight mark appears on the tapered surface of the shank or body portion at the bottom of the groove or channel. All the metal of the swaged end 2 is tightly closed around the tungsten wire, and the tungsten wire is substantially unitarily united with the swaged end of the shank or body portion 1.

In order to increase, regulate or vary the degree of flexibility of the stylus for the purpose of diminishing or modifying the volume and other qualities of the sound reproduced by the use of the stylus of this invention, (i. e. for making soft toned or half tone needles), the shank or body portion 1 may be provided with a reduced portion 26. To accomplish this, the metal of the shank may be turned to as small a diameter as may be desired with any suitable metal-cutting tool 27 and this step may be performed simultaneously with the beveling or grinding of the free end of the tungsten tip. It may, however, be done after the tip has been beveled.

For loud toned or full tone needles or styli, this step of providing the shank with the reduced portion 26 may be omitted.

This application is not to be construed as limited to any particular mechanism for performing the steps above set forth and inasmuch as various machines and mechanisms may be constructed for performing the steps of the process, and any means may be employed for forcing the tapered end 2 of the shank 1 into the die, whether the same consists of means for imparting to the shank a blow, or a series of blows, or a slow substantially continuous high pressure, provided the tapered end of the shank or body portion is thereby made to inclose the tungsten insert so firmly and tightly as to make the said insert substantially unitary with the shank or body portion.

Having thus described my invention, what I claim and desire to protect by Letters Patent is:

1. The method of making a sound reproducing stylus of two metal parts which consists in providing the end of a rod of malleable metal forming the shank with a recess, inserting a length of wire forming the tip in said recess, and swaging the end of said malleable rod to close said recess around said wire by endwise and lateral pressure to thereby permanently secure said wire to said rod.

2. The method of joining a tip to a shank to make a sound reproducing stylus which consists in providing a shank of malleable metal with a tapered end, providing a recess in said tapered end, inserting and holding the tip forming material in said recess, and swaging the end of the malleable shank by endwise and lateral pressure to permanently secure the tip to said shank by closing the recess in the shank around the tip.

3. The method of joining a tip to a shank to make a sound reproducing stylus which consists in providing the end of a malleable metal rod with a recess, inserting a length of wire in said recess, swaging the end of the malleable metal rod around said wire by endwise and lateral pressure to permanently secure said wire in said metal, and cutting off said wire a short distance from the end of the metal rod.

4. The method of joining a metal tip to a shank to make a sound reproducing stylus which consists in providing the end of a rod of malleable metal with a recess, inserting and holding a length of wire in said recess, swaging the end of the malleable metal by endwise and lateral pressure to close said recess around said wire, cutting off the wire at a short distance from the point where it protrudes from the end of the malleable rod and beveling the free end of said wire tip.

5. The method of joining a tip to a shank to make a sound reproducing stylus which consists in providing a length of malleable metal forming the shank with a recess, inserting a length of wire forming the tip in said recess, swaging the end of the shank around the tip by endwise and lateral pressure to permanently secure the tip of the shank, cutting off the tip a short distance from the end of the shank, and providing the shank with a reduced portion to form a neck in the shank adjacent the tipped end thereof.

6. The method of joining a tip to a shank to make a sound reproducing stylus which consists in transversely slotting the free end of the rod of malleable metal to form an open kerf, inserting and holding a length of wire of substantially the same diameter as the width of said kerf into said kerf with the end of the wire seated against the bottom of said kerf and with the axis of the wire in substantially co-axial alinement with the axis of said malleable metal, confining the kerfed end of said rod against lateral movement, and delivering an endwise blow to said metal while thus confined to thereby swage the kerfed end of the rod around the wire to tightly unite the tip to the shank.

7. The method of joining a tip to a shank to make a sound reproducing stylus which consists in providing a rod of malleable metal forming the shank with a transverse slot across the end thereof, inserting and holding a length of tungsten wire forming the tip in said slot, and swaging the end of said shank by endwise and lateral pressure to close the slot around said tip and permanently secure the tip to the shank.

In witness whereof, I have hereunto set my hand this 9th day of December, 1915.

WILLIAM W. MOYER.